(12) United States Patent
Painter et al.

(10) Patent No.: US 7,992,206 B1
(45) Date of Patent: Aug. 2, 2011

(54) PRE-SCANNER FOR INSPECTING NETWORK TRAFFIC FOR COMPUTER VIRUSES

(75) Inventors: Mark W. Painter, Fremont, CA (US); Jawed Sayed, Sierra Madre, CA (US)

(73) Assignee: Trend Micro Incorporated, Tokyo (JP)

( * ) Notice: Subject to any disclaimer, the term of this patent is extended or adjusted under 35 U.S.C. 154(b) by 1265 days.

(21) Appl. No.: 11/638,822

(22) Filed: Dec. 14, 2006

(51) Int. Cl.
*G06F 11/00* (2006.01)
*G06F 12/14* (2006.01)
*G06F 12/16* (2006.01)
*G08B 23/00* (2006.01)

(52) U.S. Cl. ............ 726/23; 726/13; 713/154; 713/192
(58) Field of Classification Search ............... 726/23
See application file for complete search history.

(56) References Cited

U.S. PATENT DOCUMENTS

| | | | |
|---|---|---|---|
| 5,623,600 A | 4/1997 | Ji et al. | |
| H1944 H * | 2/2001 | Cheswick et al. | 726/11 |
| 6,195,587 B1 | 2/2001 | Hruska et al. | |
| 6,938,097 B1 | 8/2005 | Vincent et al. | |
| 7,010,807 B1 | 3/2006 | Yanovsky | |
| 7,228,375 B1 * | 6/2007 | Jacobson | 710/317 |
| 7,360,242 B2 * | 4/2008 | Syvanne | 726/11 |
| 2004/0059942 A1 | 3/2004 | Xie | |
| 2005/0108554 A1 * | 5/2005 | Rubin et al. | 713/187 |
| 2005/0204151 A1 | 9/2005 | Fang et al. | |
| 2005/0229237 A1 | 10/2005 | Xie et al. | |
| 2006/0036728 A1 | 2/2006 | Xie | |

OTHER PUBLICATIONS

One Stop Systems Introduces the Max Express 1U PCIe Switch, Press Release Date: Aug. 23, 2005, pp. 1-3, ThomasNet Product News Room [retrieved on Dec. 6, 2006]. Retrieved from the internet: http://news-thomasnet.com/printready.html?prid=467483.

* cited by examiner

*Primary Examiner* — Taghi Arani
*Assistant Examiner* — Narciso Victoria
(74) *Attorney, Agent, or Firm* — Okamoto & Benedicto LLP

(57) ABSTRACT

In one embodiment, an add-on pre-scanner card is removably pluggable into a local bus of a computer. The add-on pre-scanner card may be coupled to a computer network to receive network traffic. The add-on pre-scanner card may be configured to extract payloads from received packets and scan the payloads for computer viruses. The add-on pre-scanner card may pass scanned payloads and other data to the computer by way of a shared memory interface. The pre-scanner card may identify each payload as infected with a virus, virus-free, or unknown to allow the computer to distinguish payloads that do not need further scanning from those that do. The computer may further scan for viruses payloads that the pre-scanner card cannot ascertain as either virus free or virus infected.

18 Claims, 8 Drawing Sheets

PRE-SCANNER FOR INSPECTING NETWORK TRAFFIC FOR COMPUTER VIRUSES

BACKGROUND OF THE INVENTION

1. Field of the Invention

The present invention relates generally to computer networks, and more particularly but not exclusively to network security apparatus.

2. Description of the Background Art

Computer viruses, worms, Trojans, and spyware are examples of malicious codes that have plagued computer systems throughout the world. Although there are technical differences between each type of malicious code, malicious codes are collectively referred to herein as "viruses" for ease of illustration and compliance with common usage.

The Internet and similar public networks enable viruses to spread quickly to infect a large number of computers. As a precautionary measure against viruses, private computer networks may deploy a virus scanner between its computers and the Internet. Currently available in-line virus scanners perform either store-scan-forward scanning or stream scanning. Store-scan-forward scanning is typically implemented in software using a complex file-based scanner. A complex file-based scanner stores received incoming data, waits to receive all of the data comprising a file, scans the file for viruses once all of its data are received, and forwards the data to its destination assuming no viruses are found in the file. Being implemented in software, store-scan-forward scanning provides great flexibility, is easily extensible, allows for high virus detection rate with relatively low false positives (i.e., erroneous detection of a virus) and low false negatives (i.e., failure to identify a virus). However, relying on a software implementation yields relatively slow performance, resulting in excessive, sometimes unacceptable, processing delays.

Stream scanning, also referred to as "cut-through" scanning, receives, scans, and forwards data on non-file data units, typically on packet levels. Scanning commences as soon as a number of data units become available, and scanned data units are immediately forwarded out to their destination assuming no viruses are found. This way, data receiving, scanning, and forwarding occur concurrently, allowing for faster throughput compared to store-scan-forward scanning. Stream scanning, whether implemented in hardware or software, provides performance advantage that is noticeable by the end-user. However, stream scanning has relatively low virus detection capability because only forward scanning is possible, and has higher rates of false positives and false negatives. In addition, hardware based implementations often rely on less sophisticated scanning algorithms that open up the network to virus attacks.

SUMMARY

In one embodiment, an add-on pre-scanner card is removably pluggable into a local bus of a computer. The add-on pre-scanner card may be coupled to a computer network to receive network traffic. The add-on pre-scanner card may be configured to extract payloads from received packets and scan the payloads for computer viruses. The add-on pre-scanner card may pass scanned payloads and other data to the computer by way of a shared memory interface. The pre-scanner card may identify each payload as infected with a virus, virus-free, or unknown to allow the computer to distinguish payloads that do not need further scanning from those that do. The computer may further scan for viruses payloads that the pre-scanner card cannot ascertain as either virus free or virus infected.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1A:
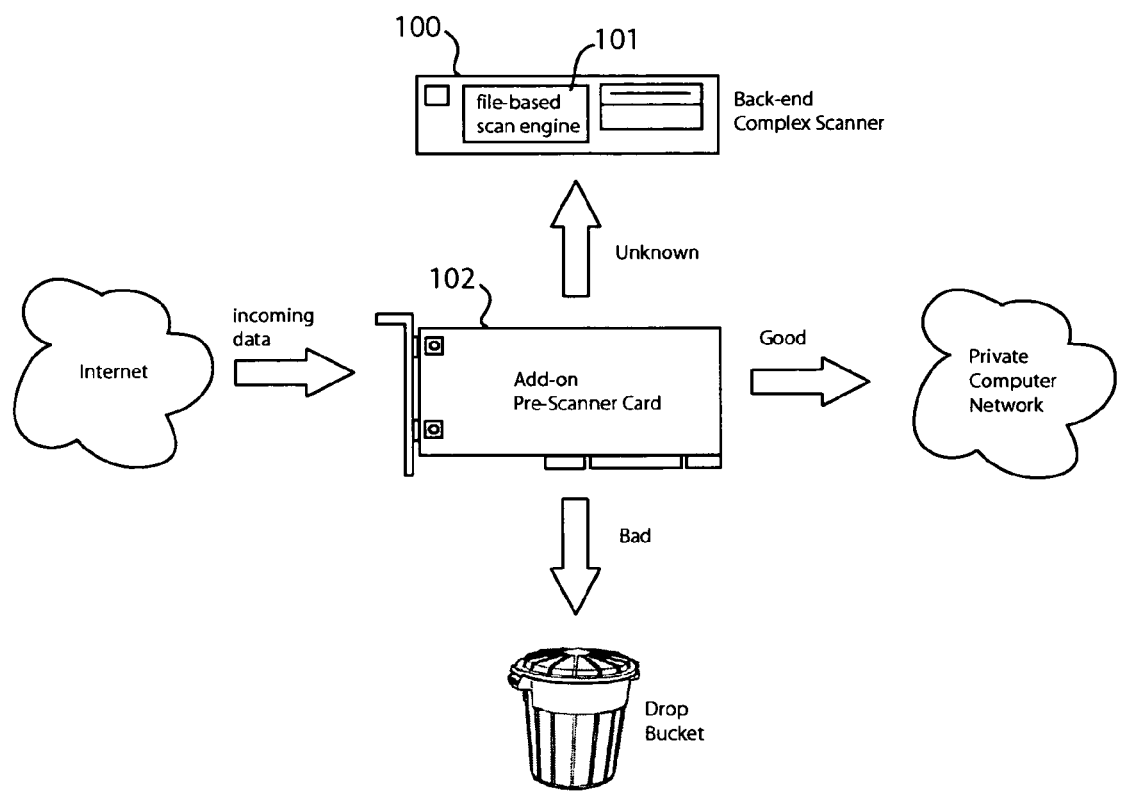
FIG. 1A schematically illustrates an overview of the operation of an add-on pre-scanner card in accordance with an embodiment of the present invention.

FIG. 1A schematically illustrates an overview of the operation of an add-on pre-scanner card 102 in accordance with an embodiment of the present invention. In one embodiment, the pre-scanner card 102 is configured as an intrusive, in-line (also referred to as "bump-in-the-wire") apparatus for inspecting computer network traffic for viruses. The pre-scanner card 102 may be configured to receive incoming data and determine whether the data is free of viruses (also referred to as "good data"), infected with one or more viruses (also referred to as "bad data"), or in an unknown state (i.e., the pre-scanner card 102 cannot determine whether or not the data is infected). The pre-scanner card 102 may identify good data so that a back-end complex scanner 100 does not have to scan that data for viruses, reducing its virus scanning workload. In the example of FIG. 1A, the pre-scanner card 102 in conjunction with the back-end complex scanner 100 may allow good data from the Internet to enter to the private computer network. The pre-scanner card 102 may also inspect data passing in the other direction, between two private computer networks, between segments of a private computer network, and so on. The pre-scanner card 102 in conjunction with the back-end complex scanner 100 may be configured to block bad data. For example, the pre-scanner card 102 may drop or quarantine bad data. Notification of the blocking may be passed to the back-end complex scanner 100 for logging and reporting purposes.

In the example of FIG. 1A, data in the unknown state is passed to a back-end complex scanner 100 for second level scanning. The back-end complex scanner 100 may comprise a general purpose computer, such as a server or desktop computer with a local bus, with a file-based scan engine 101. The file-based scan engine 101 is preferably implemented as software stored in computer memory and executed by the processor of the back-end scanner 100. The file-based scan engine 101 may be a conventional file-based antivirus scan engine, such as those from antivirus vendors including Trend Micro, Inc. The file-based scan engine 101 allows for more comprehensive virus scanning at the expense of performance. However, the pre-processing performed on incoming data by the pre-scanner card 102 minimizes the virus scanning workload of the file-based scan engine 101. Using a file-based scan engine 101 to perform comprehensive virus scanning simplifies the design and implementation of the scan engine of the pre-scanner card 102, allowing the pre-scanner card 102 to operate faster.

Generally speaking, the pre-scanner card 102 and a back-end complex scanner 100 together performs a two-level virus scanning, with the pre-scanner card 102 performing a first level virus scanning of incoming data on a packet level and the back-end complex scanner 100 performing a second level virus scanning of the incoming data on a file-level in the event the pre-scanner card 102 cannot determine whether or not the incoming data is infected by a virus. This two-level virus scanning approach allows for the reduced latency and higher performance of hardware-based stream scanners with the accuracy and flexibility of software-based store-scan-forward scanners.

The pre-scanner card 102 is an "add-on" card in that it is configured to be removably plugged into a bus of a general purpose computer. For example, the pre-scanner card 102 may be readily installed in a computer by inserting the pre-scanner card 102 into a slot or terminal of a local bus of the computer; the pre-scanner card 102 may also be removed from the local bus by simply lifting it from the slot or terminal.

While the pre-scanner card 102 may be effectively integrated with a back-end complex scanner 100 in the same motherboard, implementing it as an add-on card provides several advantages heretofore unrealized. First, the pre-scanner card 102 may be readily installed in existing customer computers. Second, antivirus vendors may readily integrate the operation of the pre-scanner card 102 with file-based virus scanners in current customer installations by adding interfacing software modules. Third, the use of an add-on card rather than a dedicated appliance allows existing customers to migrate for improved performance incrementally and at reasonable cost. Fourth, the pre-scanner card 102 may be moved to faster computers as they become available. Fifth, upgrading the pre-scanner card 102 with newer versions only requires removal of the old add-on card and installing the new one in its place in the same computer.

In one embodiment, the pre-scanner card 102 comprises a PCI (Peripheral Component Interconnect) card pluggable into a PCI local bus. Other buses may also be employed without detracting from the merits of the present invention. The pre-scanner card 102 may be installed in an available bus slot or terminal of a back-end complex scanner 100, for example. In other embodiments, the pre-scanner card 102 may be integrated with the motherboard of the back-end complex scanner 100.

Figure 1B:
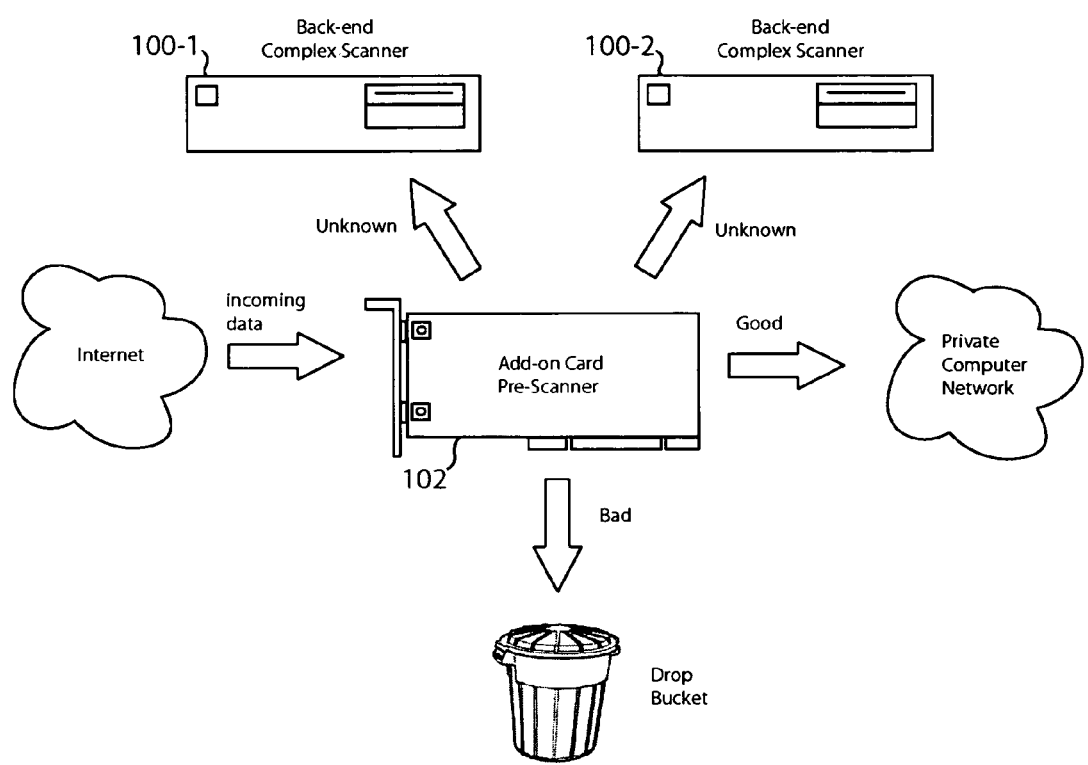
FIGS. 1B and 1C schematically illustrate other configurations of the add-on pre-scanner card, in accordance with embodiments of the present invention.

FIG. 1B schematically illustrates another configuration where an add-on pre-scanner card 102 passes unknown data to either of two back-end complex scanners 100 (i.e., 100-1, 100-2) in accordance with an embodiment of the present invention. The configuration of FIG. 1B increases the throughput of the pre-scanner card 102 by offloading file-based virus scanning to one of two back-end complex scanners 100.

Figure 1C:
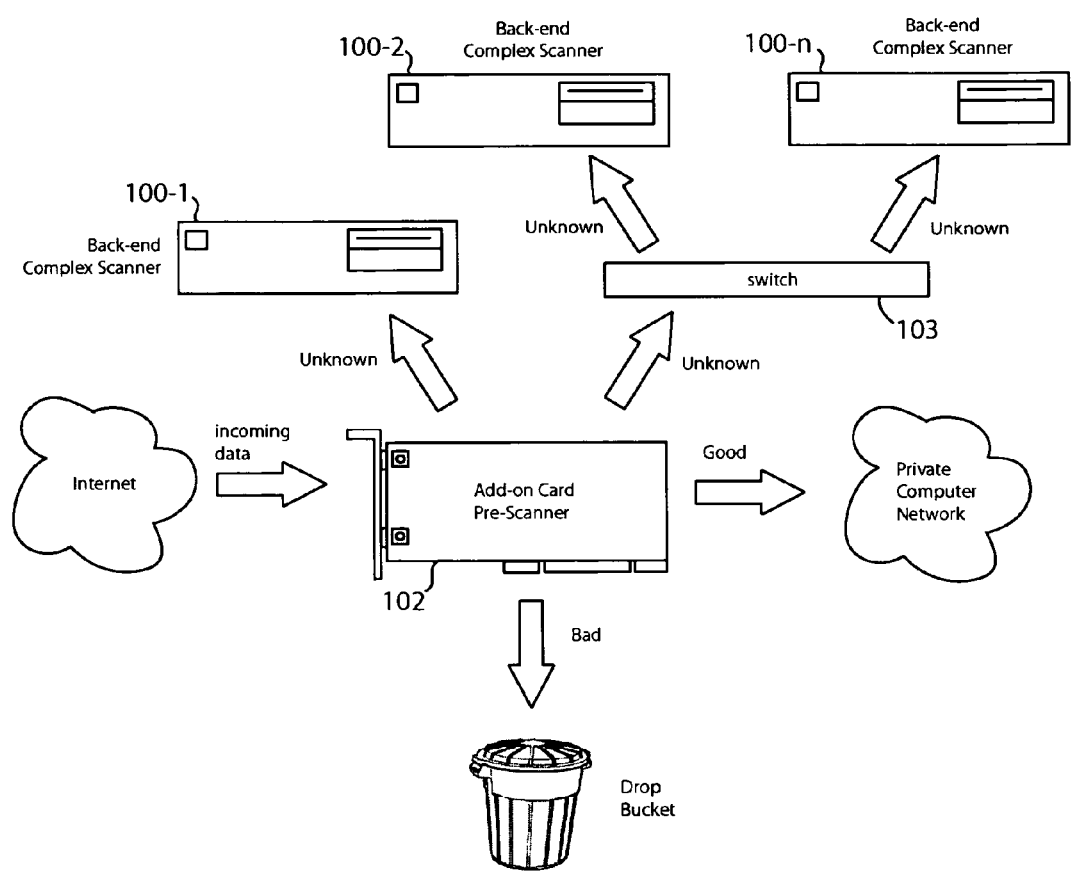

FIG. 1C schematically illustrates another configuration where an add-on pre-scanner card 102 is configured to pass unknown data to one of multiple two back-end complex scanners 100 in accordance with an embodiment of the present invention. The configuration of FIG. 1C further increases the throughput of the pre-scanner card 102 by offloading file-based virus scanning to one of several back-end complex scanners 100.

Figure 2:
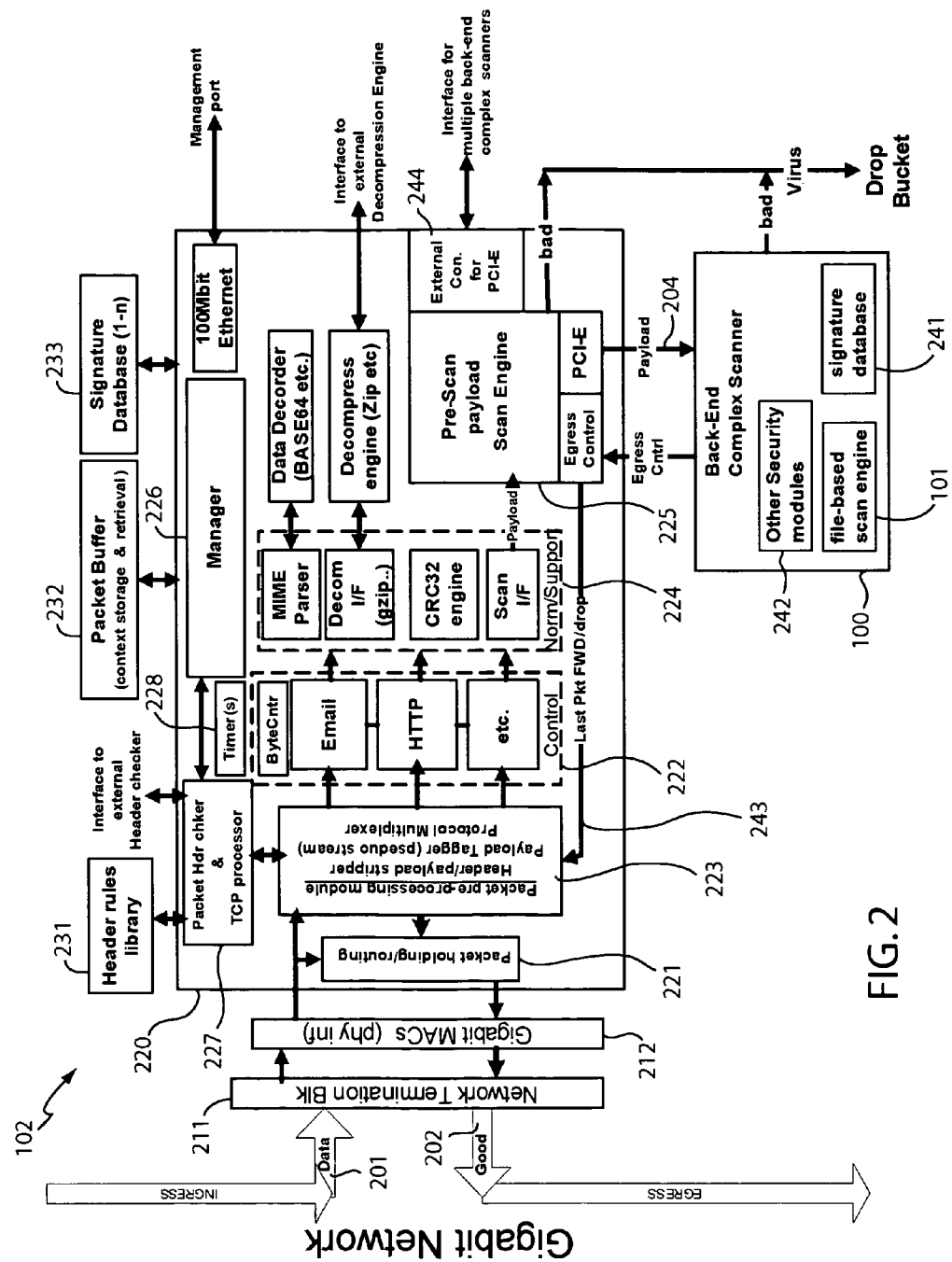
FIG. 2 schematically shows an add-on pre-scanner card in accordance with an embodiment of the present invention.

In the example of FIG. 1C, a switch 103 allows unknown data to be passed to other back-end complex scanners 100 coupled to the switch. FIG. 2 schematically shows an add-on pre-scanner card 102 in accordance with an embodiment of the present invention. Note that not all connections are shown in FIG. 2 for clarity of illustration. In one embodiment, the pre-scanner card 102 operates on TCP (transmission control protocol) packets. The pre-scanner card 102 may pre-scan incoming TCP packets to classify them as good (i.e., virus free), bad (i.e., virus infected), or unknown (i.e., cannot determine whether infected or not). Unknown packets are sent to a back-end complex scanner 100 for more comprehensive virus scanning by a file-based scan engine 101. This reduces the scanning load of the back-end complex scanner 100 without compromising detection accuracy. Data and summary information for good data may be passed to the back-end complex scanner 100 in order to perform additional checks on the data, such as to check if an email has content characteristic of SPAM or to verify the digital signatures of ActiveX controls. The pre-scanner card 102 may also perform control, normalization, and support functions to off-load these functions from the back-end complex scanner 100 for even more performance gains.

In the example of FIG. 2, the pre-scanner card 102 includes a network termination block 211 and a network interface 212 to send (see arrow 202) and receive (see arrow 201) TCP packets to and from a gigabit computer network. The network termination block 211 may comprise one or more terminals for plugging network communication cables to the pre-scanner card 102. The network interface 212 may comprise a network interface chip, such as the Intel® IXF 1002 Dual-Port Gigabit Ethernet MAC, MAC-1G1 Gigabit Ethernet Media Access Controller Core from Evatronix of Poland, MorethanIP GmbH of Germany or equivalent soft core from other IP vendors.

The pre-scanner card 102 may include programmable logic 220, which may comprise one or more ASIC (application-specific integrated circuit) or FPGA (Field Programmable Gate Array) devices. The programmable logic 220 may include a packet routing and holding area 221, a packet pre-processing module 223, a control module 222, a normalization and support module 224, a scan engine 225, a packet header and checker/TCP processor module 227, timers 228, and a manager 226.

The packet routing and holding area 221 may comprise a limited amount of data storage locations configured to provide buffering for down-stream processing delays. Received packets sit in the packet routing and holding area 221 until the next packet arrives. A packet currently in the packet routing and holding area 221 is also referred to herein as "current packet." The pre-scanner card 102 may perform one of the following actions depending on the next arriving packet:

If the next arriving packet is of the same flow (as indicated by packet pre-processing module 223) as the current packet and not the last packet (based on arriving state and not the sequential number), the current packet is immediately transmitted out back to the network.

If the next arriving packet is the last packet and is of the same flow as the current packet, the pre-scanner card 102 waits for a forward or drop command from the back-end complex scanner 100, which is routed through the scan engine 225 (see arrow 243).

If the next arriving packet is not of the same flow as the current packet, then the current packet is swapped out to the packet buffer 232, making space in the packet holding and routing area 221 for the next arriving packet. The previously current packet may be swapped back from the packet buffer 232 to the packet holding and routing area 221 as required.

The packet pre-processing module 223 may be configured to strip header and payload from packets, tag payloads with flow tags, and forward payloads to corresponding protocol analyzers in the control module 222. In one embodiment, the pre-processing module 223 also receives current packets sitting in the packet holding and routing area 221. The packet pre-processing module 223 does not have to receive the complete set of packets of a particular flow to operate on current packets.

The packet pre-processing module 223 may forward current packets to the TCP processor of the module 221 for validation and to classify them as part of a packet flow. As can be appreciated, a packet flow may comprise a plurality of packets associated with a particular TCP connection.

The packet pre-processing module 223 may create and attach a flow tag to each packet payload. Flow tags may be used to determine which payload goes with which packet flow. A flow tag may include VLAN (virtual local area network) information, packet sequential number, summary of packet header information (e.g., source and destination IP addresses and port numbers, etc.), and other information. The flow tags may be generated based on packet sequence number or other packet identifier.

The packet pre-processing module 223 may forward packet headers, payload, and corresponding flow tags to the packet header and checker/TCP processor module 227 for network security inspection. The module 227 may consult a header rules library 231 stored in memory (e.g., SDRAM) coupled to the programmable logic 220 to determine whether or not a packet is to be dropped and its associated flow blocked. The header rules library 231 may comprise rules and information on how to identify network security threats. For example, the header rules library 231 may comprise a listing of IP addresses that are not allowed to traverse the network, rules for authenticating TCP/IP connections, flow tags of packets to be blocked, and so on. As a particular example, the packet pre-processor module 223 may strip the header of a current packet and pass that header to the module 227, where the IP address noted in the header is compared against a list of banned or to be blocked IP addresses listed in the header rules library 231. As another example, the module 227 may use the timers 228 to detect expired packets and to block packets with particular sequence numbers for a period of time. Once a packet is blocked, packets belonging to the same flow as that packet may also be blocked.

The packet pre-processing module 223 may determine the communication protocol of the current packet and forward the current packet to the appropriate protocol analyzer in the control module 222. For example, the packet pre-processing module may inspect the packet and determine from its destination port number whether it is for SMTP (e.g., port 80) or HTTP (e.g., port 25).

The control module 222 may include a protocol analyzer for analyzing packets of particular communication protocols. In the example of FIG. 2, the control module 222 includes protocol analyzers for SMTP (simple mail transfer protocol) and HTTP (hyper text transfer protocol). A protocol analyzer may be configured to understand and parse a particular protocol. A protocol analyzer may operate with the normalization and support module 224. For example, an email analyzer for SMTP may employ a MIME parser to extract attachments from an email, a decompression engine to decompress archived files, and so on. The control module 222 may also have an interface for receiving packets for raw files from the packet pre-processing module 223. The normalization and support module 224 may also include a cyclic redundancy check (CRC) engine and an interface to the scan engine 225. The CRC engine may be configured to produce a unique numerical fingerprint in the form of a checksum for payloads or other unique piece of data processed by the pre-scanner card 102. A scan interface may allow data, such as payloads extracted from current packets, to be forwarded to the scan engine 225 for virus scanning and forwarding to the back-end complex scanner 100.

The manager 226 may be configured to coordinate the operation of the pre-scanner card 102 and may provide control and status registers. The manger 226 may be implemented as a state machine, for example.

The scan engine 225 may be configured to scan data for computer viruses. In one embodiment, the scan engine 225 scans data on a packet level. In the example of FIG. 2, the scan engine 225 consults the signature database 233 to determine whether a payload of a particular packet is good, bad, or unknown. The scan engine 225 may compare the contents of a payload to virus signatures in the database 233 to determine whether or not the payload is bad (i.e., infected with a virus). If the payload is bad, the scan engine 225 may indicate in the payload's flow tag that the packet is bad so that the back-end complex scanner 100 does not have to bother scanning the payload for viruses. This advantageously reduces the virus scanning workload of the back-end complex scanner 100. The bad payload may be transmitted to the back-end complex scanner 100 for logging. Upon finding from the flow tag that the payload is bad, the back-end complex scanner 100 logs the event and sends a drop command to the packet pre-processing module 223 to drop the packet carrying the payload. In response, the packet pre-processing module 223 drops the bad packet and blocks other packets of the same flow.

The scan engine 225 may also compare the contents of the payload for patterns in the database 233 indicating that the payload is good (i.e., not infected with a virus). For example, the contents of the payload may not be executable by a processor (e.g., plain text) or does not match one or more sub-patterns that are known to be present in all virus patterns in both the signature database 233 employed by the scan engine 225 and the signature database 241 employed by the file-based scan engine 101. In those cases, the scan engine 225 may deem the payload to be good and accordingly so indicate in the payload's flow tag. The back-end complex scanner 100 may read the flow tag to determine that the payload is good. Accordingly, the back-end complex scanner 100 does not have to bother scanning the payload for viruses, reducing its virus scanning workload.

In the event the scan engine 225 cannot determine whether the payload is good or bad, such as when the contents of the payload match an aggressive signature that is known to have false positives in the signature database 233, the payload may be deemed unknown. In that case, the scan engine 225 may indicate in the payload's flow tag that the payload is unknown before transmitting the payload to the back-end scanner 100 (see arrow 204).

In one embodiment, the scan engine 225 sends all payloads (i.e., whether good, bar, or unknown) to the back-end complex scanner 100 for event logging and egress control coordination by way of a local bus. The local bus comprises the PCI-Express bus in one embodiment. The scan engine 225 may communicate with the back-end complex scanner 100 by passing data to each other using a shared memory interface on the local bus (see FIG. 3). The back-end complex scanner 100 may read the flow tag of a payload to find associated payloads and to determine whether a payload is good, bad, or unknown based on the virus scanning performed by the scan engine 225. The back-end complex scanner 100 may send a packet drop command to the packet pre-processing module 223 by way of the scan engine 225 for packets carrying a bad payload.

The back-end complex scanner 100 may include a file-based scan engine 101 that consults a signature database 341 to determine whether or not a file contains a virus. The back-end complex scanner 100 may use the file-based scan engine 101 to virus scan payloads that have been tagged by the scan engine 225 as unknown. In one embodiment, the back-end complex scanner 100 gathers unknown payloads of the same flow tag to build a logical file. Upon receiving enough payloads to build the logical file, the file-based scan engine 101 may scan the file for viruses using conventional pattern matching techniques. The file-based scan engine 101 may compare the contents of the file to those in the signature database 241 to determine whether or not the file contains a virus. Because the signature database 241 is more exact (i.e., configured to have more precise patterns) than the signature database 233 for more complete virus scanning and because the file-based scan engine 101 has more data to work with (i.e., scans an entire file), the back-end complex scanner 100 allows for more comprehensive scanning than the scan engine 225 of the pre-scanner card 102. The performance penalty involved with comprehensive scanning in the back-end complex scanner 100 is minimized by having the pre-scanner card 102 pre-process the incoming packets to detect readily identifiable bad and good packets.

The back-end complex scanner 100 may also include other security modules 242 for URL filtering, certificate validation, IP reputation, anti-phishing, anti-spam, and other conventional network security procedures.

The back-end complex scanner 100 may send a forward command to the packet pre-processing module 223 to allow good packets to pass through and propagate back onto the network. The back-end complex scanner 100 may send a drop command to the packet pre-processing module 223 to drop and block bad packets.

The pre-scanner card 102 may be configured to work with more than one back-end complex scanner 100. In the example of FIG. 2, the pre-scanner card 102 includes an interface 244 for multiple back-end complex scanners 100. The interface 244 may comprise a PCI-Express over cable interface, commercially available from Texas Instruments, Inc., for example.

Figure 3:
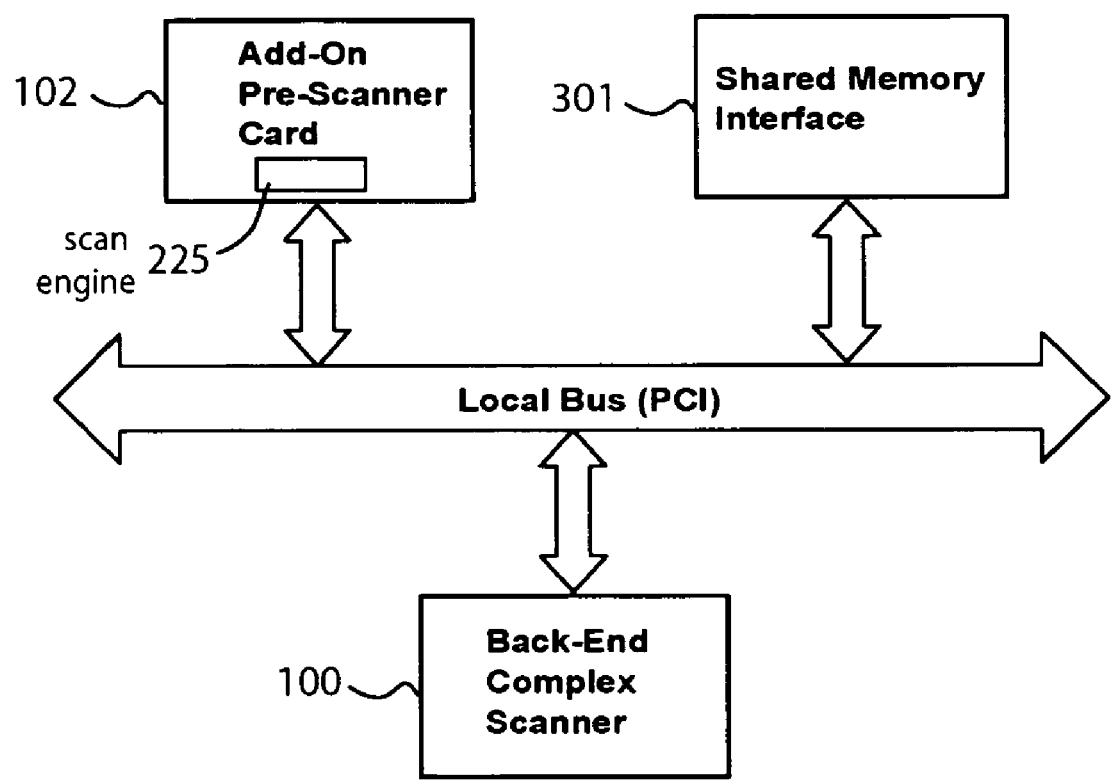
FIG. 3 schematically shows the use of a shared memory interface as a communication channel between an add-on pre-scanner card and a back-end complex scanner in accordance with an embodiment of the present invention.

In one embodiment, the pre-scanner card 102 and a back-end complex scanner 100 communicates to each other by passing messages and data using a shared memory interface. FIG. 3 schematically shows the use of a shared memory interface 301 as a communication channel between the pre-scanner card 102 and the back-end complex scanner 100 in accordance with an embodiment of the present invention. The shared memory interface 301 is preferably located in the local bus (e.g., PCI bus) to readily allow memory space sharing. The shared memory interface may comprise dual ported RAM (DPR) with associated control/contention logic and instruction decoder. The shared memory interface 301 may have separate address and data lines. The pre-scanner card 102 and the back-end complex scanner 100 may pass command, status, payload, and other data to each other by reading and writing to the shared memory interface 301. The pre-scanner card 102 may communicate with the back-end complex scanner 100 by way of logic through the scan engine 225. The shared memory interface 301 may be physically located separate from or as part of the pre-scanner card 102.

Figure 4:
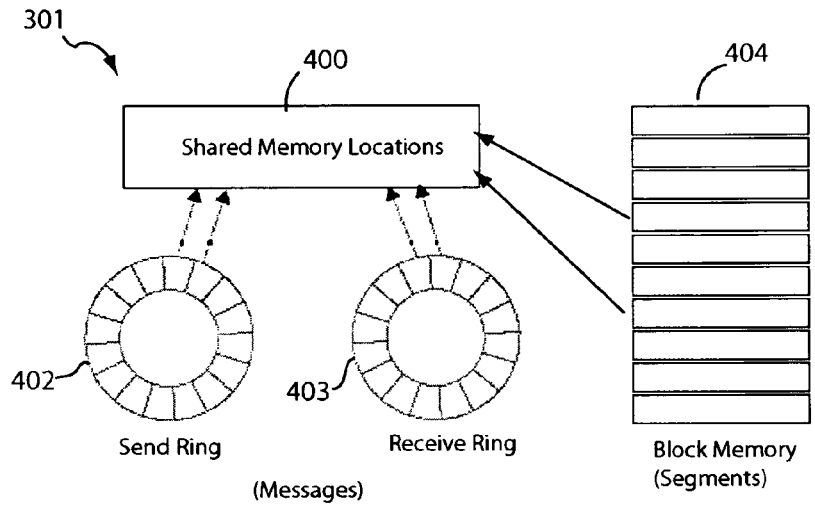
FIG. 4 schematically shows the architecture of a shared memory interface in accordance with an embodiment of the present invention.

FIG. 4 schematically shows the architecture of the shared memory interface 301 in accordance with an embodiment of the present invention. The shared memory interface 301 may comprise shared memory locations 400 having portions allocated for sending and receiving messages and portions allocated for sending and receiving segments. In the example of FIG. 4, the shared memory interface 301 includes a pair of message rings, a send ring 402 and a receive ring 403, each of which is configured as a circular array of control message buffers and related state machine. The pre-scanner card 102 and the back-end complex scanner 100 may periodically poll the send ring 402 and the receive ring 403 to determine whether or not data is waiting for them.

The send ring buffer 402 and the receive ring buffer 403 may be managed as a generator/consumer queue. The send ring buffer 402 may be configured for sending messages from the pre-scanner card 102 to the back-end complex scanner 100. For example, the pre-scanner card 102 may write a message into the send ring 402. The back-end complex scanner 100 may poll the send ring 102 for new messages and, upon finding the message from the pre-scanner card 102, pick-up the message and advance the pointer of the send ring 402 to the next buffer location. Similarly, the receive ring 403 may be configured for sending messages from the back-end complex scanner 100 to the pre-scanner card 102. For example, the back-end complex scanner 100 may write a message into the receive ring 403. The pre-scanner card 102 may poll the receive ring 403 for new messages and, upon finding the message from the back-end complex scanner 100, read the message and advance the pointer of the receive ring 403 to the next buffer location. The send ring 402 and the receive ring 403 may be configured to have enough buffer locations to prevent buffer overrun. The block memory 404 may comprise blocks of memory locations for storing segments comprising payloads and other data.

Figure 5:
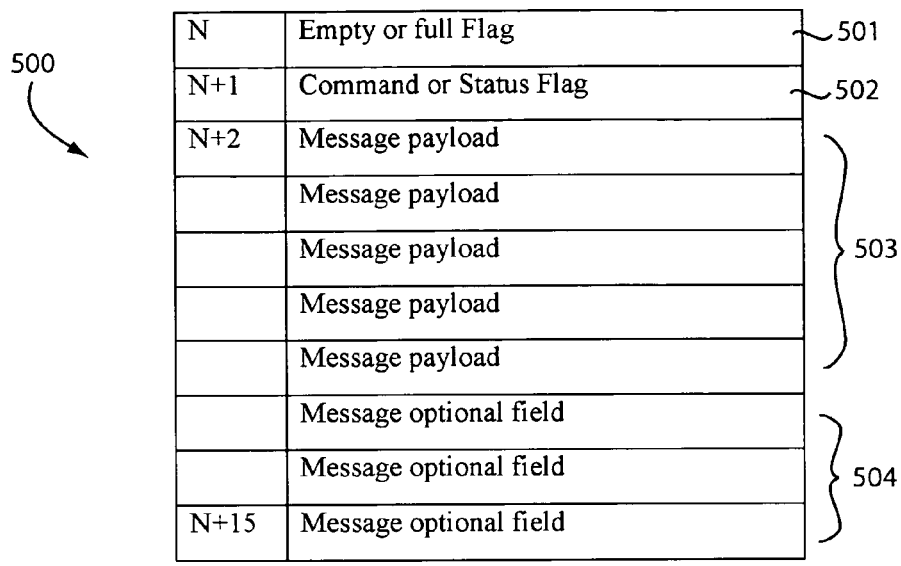
FIG. 5 schematically shows a message that may be passed between an add-on pre-scanner card and a back-end complex scanner in accordance with an embodiment of the present invention.
Figure 6:
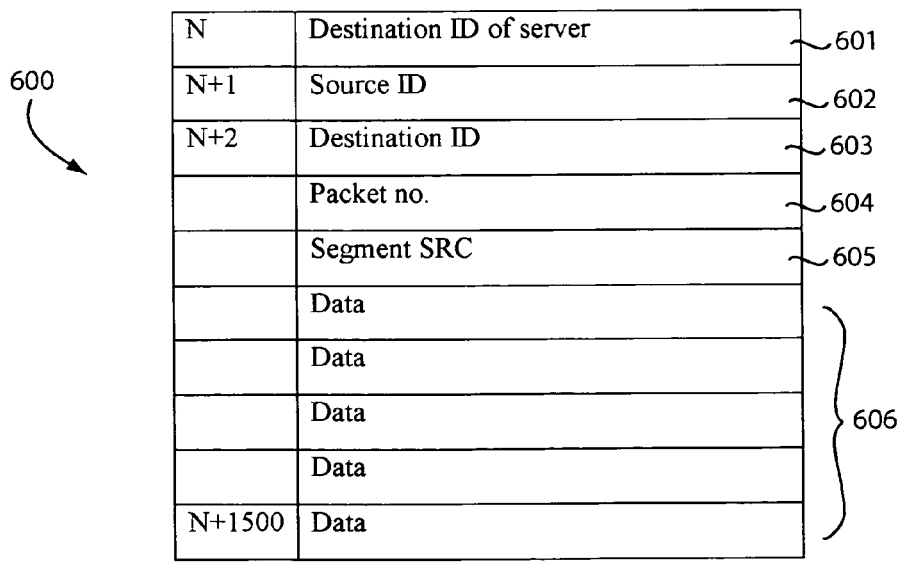
FIG. 6 schematically shows a segment that may be passed from an add-on pre-scanner card to a back-end complex scanner in accordance with an embodiment of the present invention.

FIG. 5 schematically shows a message 500 in accordance with an embodiment of the present invention. A message 500 may comprise a short control message (e.g., 16 bytes) that may take the form of a command or status. A message 500 may have message dependent message payloads 503 and optional fields 504. For example, the message payloads 503 may comprise the operation code for a command (e.g., virus scan an unknown packet) and parameters for the command (e.g., address of a corresponding segment 600, as shown in FIG. 6, containing the packet payload). As another example, the message payloads 503 may comprise processing status (e.g., results of virus scanning).

The transfer of a message 500 in and out of the shared memory interface 301 is preferably done using programmed I/O (input output), also referred to as the "PIO method." In the PIO method, the pre-scanner card 102 and a back-end complex scanner 100 reads from or writes into the shared memory interface 301 by making I/O reads and writes.

Interrupt processing is compute intensive on most operating systems (can consume several thousands CPU cycles) and should be reduced to a minimum. Therefore, per packet interrupts is preferably avoided. This is especially important with high packet arrival rates, as can be expected on a low latency, high speed interconnect. Thus, instead of an interrupt scheme, a polling method to determine whether or not a new message is in the message rings 402 or 403 is preferred to reduce latency. In one embodiment, the pre-scanner car 102 and the back-end complex scanner 100 poll an empty or full flag 501 to determine whether or not a message 500 is empty (does not contain a message) or full (contains a message). The command or status flag 502 indicates whether or not the message 500 contains a command or status.

FIG. 6 schematically shows a segment 600 in accordance with an embodiment of the present invention. A segment 600 may comprise a packet payload to be scanned for viruses and other network security processing and flow tags used to track and identify the packet payload. The packet payload and flow tags may be included in the segment 600.

The field 601 may hold the ID number of a particular back-end complex scanner 100 in configurations where there the pre-scanner card 102 works with multiple back-end complex scanners. Using the field 601 to identify a back-end complex scanner 100 is simpler but more dynamic than using an existing 32 bit IP address. In implementations where a back-end complex scanner 100 is hot pluggable, the add-on pre-scanner card 102 may be configured to assign the ID number of the back-end complex scanner 100 upon its detection on the local bus. The fields 602-605 may indicate the ID number of the client in session, the ID of the server in session with the client, the packet number of the session, and the routing segment IP address, respectively. Fields 606 may contain the payload of the packet in session and other information. A segment 600 may be configured differently to meet a particular implementation without detracting from the merits of the present invention.

The size of a segment 600 may be equal to the size of a flow tag plus the largest Ethernet packet size. Preferably, segments 600 may be linked together to form larger packet payloads, such as those required for jumbo packets (e.g., 9 Kbytes). For example, a first segment 600 may hold the flow tag and the following linked segments 600 may be configured as pure data buffers holding the jumbo packet payload.

Even though the shared memory interface 301 is configured as full duplex to allow either the pre-scanner card 102 or a back-end complex scanner 100 to access messages 500 in the message rings 402 and 403, transfer of segments 600 is preferably simplex. In one embodiment, a segment 600 is always transferred from the pre-scanner card 102 to the shared memory interface 301 and then to a back-end complex scanner 100. The transfer of segments 600 from the shared memory interface 301 may be by direct memory access (DMA) to aligned page frames of main memory in the back-end complex scanner 100 allocated by a device driver 701 (see FIG. 7) from a virtual memory page pool.

In one embodiment, the pre-scanner card 102 and a back-end complex scanner 100 communicate using a client-server model, with the pre-scanner card 102 working as a client and the back-end complex scanner 100 working as a server. A back-end complex scanner 100 may be viewed as a slave entity, waiting and interpreting commands from the pre-scanner card 102. Commands from the pre-scanner 102 and responses from the back-end complex scanner 100 may comprise messages 500 posted in the shared memory interface 301.

Figure 7:
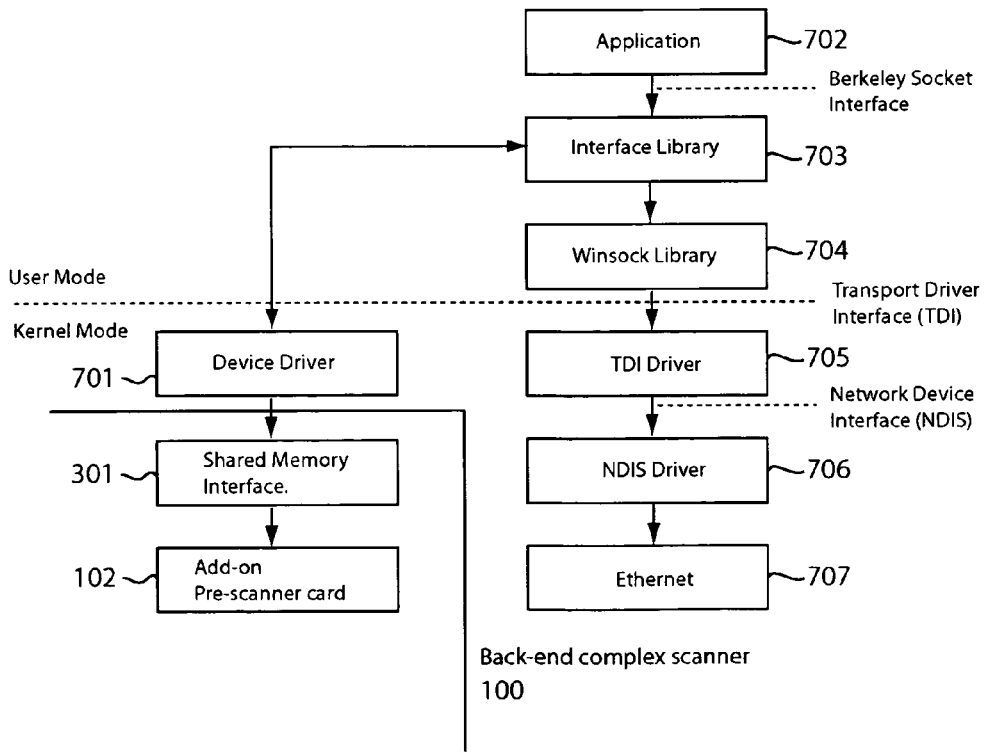
FIG. 7 schematically shows a software interface between an add-on pre-scanner card and a back-end complex scanner in accordance with an embodiment of the present invention.

FIG. 7 schematically illustrates the software interface between an add-on pre-scanner card 102 and a back-end complex scanner 100 in accordance with an embodiment of the present invention. In the example of FIG. 7, the pre-scanner card 102 is removably plugged (i.e., can be readily removed and installed) in the local bus of the back-end complex scanner 100. The shared memory interface 301 may be a separate memory card also removably plugged into the same local bus. The components 701-707 are components of the back-end complex scanner 100.

For example, an application 702 may send data to an Ethernet card 707 by making a conventional call that flows through the interface library 703, winsock library 704, transport driver interface (TDI) driver 705, and network device interface (NDIS) driver 706. In contrast, the application 702 running in the back-end complex scanner 100 may communicate with the pre-scanner card 102 by way of an application level socket interface implemented using I/O Completion Ports (IOCP). Such implementation provides an industry standard API (application programming interface) to a programmer, thus simplifying software development, updates, and maintenance cycles.

Generally speaking, sockets implementation is located in the operating system kernel. Thus, every socket operation involves a transition into the kernel and back, which is very expensive in terms of latency. Invoking driver-supported kernel entry point costs thousands of CPU cycles. Decoupling of the kernel-based device driver 701 from the application code is achieved using the shared memory interface 301, which is accessible by either the pre-scanner card 102 or the back-end complex scanner 100. Using this method, kernel calls are avoided in the predominant code path of the sockets implementation. In the example of FIG. 7, a kernel component in the form of the device driver 701 sets up shared memory mapping. However, the kernel is not involved during the bulk of data transfer between the pre-scanner card 102 and the back-end complex scanner 100.

As shown in FIGS. 1B and 1C, the pre-scanner card 102 may divide file-based antivirus scanning and other security processing workloads among several back-end complex scanners 100. In those cases, the pre-scanner card 102 divides, maintains, and controls workloads on a per packet flow basis. The connectivity fabric between the back-end complex scanners 100 and the pre-scanner card 102 may be created using PCI-Express over cable devices. Generally speaking, PCI-Express over cable is designed to connect modular computers together by use of Cat6 cables or fibers, which are normally used for Gigabit Ethernet connections.

Figure 8:
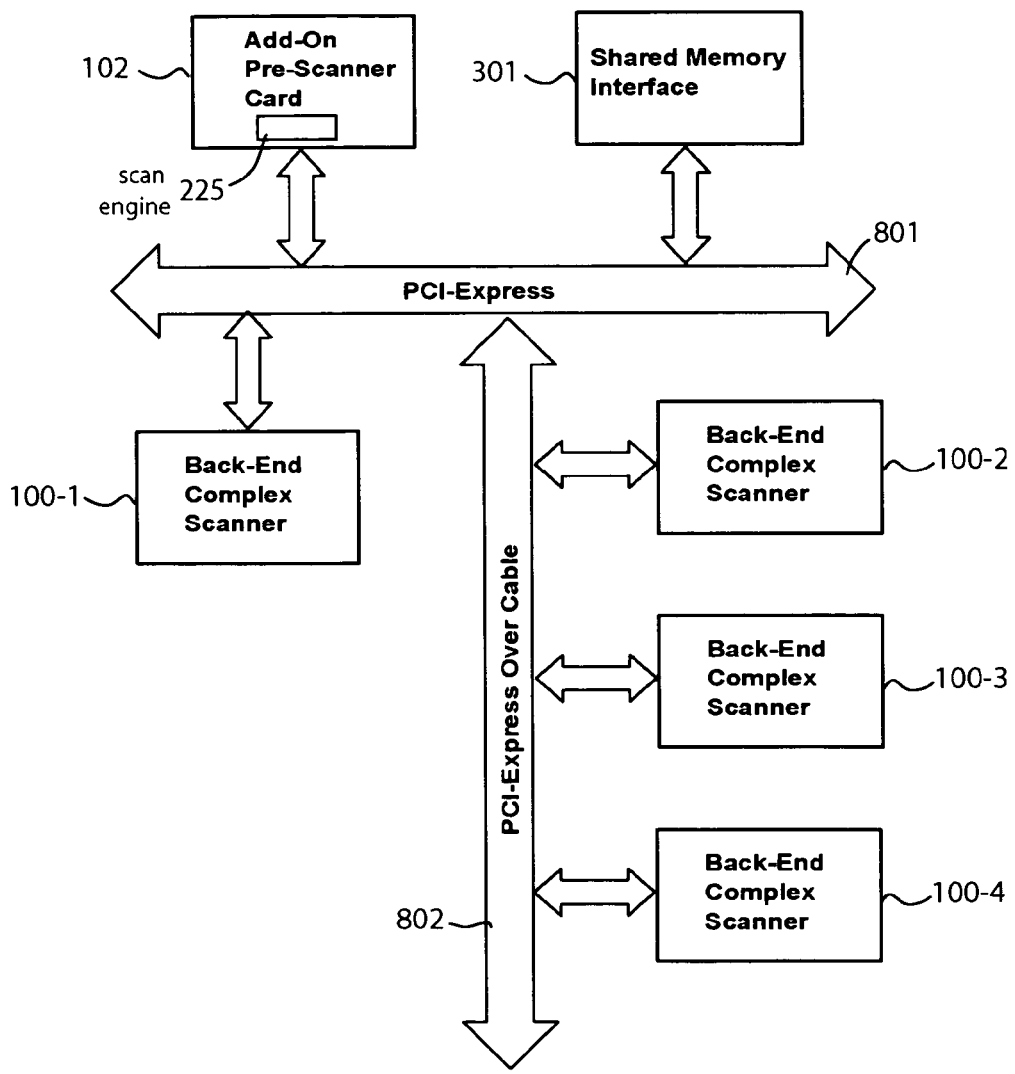
FIG. 8 schematically shows an add-on pre-scanner card coupled to multiple back-end complex scanners in accordance with an embodiment of the present invention.

PCI-Express over cable facilitates a remote memory access (RMA) communication model that allows several back-end complex scanners to communicate with the same pre-scanner card 102. Remote memory access is a communication model for multipoint servers; it is an excellent connectivity model to achieve zero-copy communication. Remote memory access achieves high performance and lowers latency by overlapping communication and computation. In this model, several back-end complex scanners 100 remotely access the shared memory interface 301 by way of the PCI-Express over cable interface coupled to the PCI-Express bus where the shared memory interface 301 and the pre-scanner card 102 are installed. In the example of FIG. 8, the back-end complex scanner 100-1 accesses the shared memory interface 301 directly (i.e., in the same computer) over a PCI-Express bus 801, while the back-end complex scanners 100-2, 100-3, and 100-4 access the shared memory interface 301 remotely over a PCI-Express bus over cable 802. A PCI-Express switch (see FIG. 1C) may be employed to select particular back-end complex scanners depending on implementation.

A remote memory access model views local or remote nodes as transparent shared memory. Each node can directly access the other node's memory just as easily as its own local memory. In the case of a block move (e.g., transfer of segments 600), a node can use its DMA controller to copy a block of memory directly between PCI-Express (local or remote) in a single copy operation with no need for intermediate buffer memories (so called "Zero Copy" operation). This feature greatly reduces latency and lowers overhead of data transfer. The DMA controller may be configured to support both read and write operations and be fully interleaved with remote memory access operations. Using remote memory access achieves zero-copy communication. Zero-copy communication protocols remove memory performance factors from communication performance models and help avoid wasting the valuable and limited memory bandwidth of computing nodes.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A network security apparatus comprising:
an add-on pre-scanner card configured to receive a packet from a computer network, extract a payload from the received packet, associate a flow tag with the payload, and scan the payload to determine if the payload contains a virus, does not contain a virus, or cannot be ascertained as to whether or not it contains a virus;
a computer having a local bus into which the add-on pre-scanner card is removably installed, the computer being configured to gather other payloads of the same packet flow as the payload to assemble a corresponding file, the computer including a file-based scan engine configured to scan the assembled file for viruses when the add-on pre-scanner card indicates that it cannot determine whether or not the payload contains a virus; and
a shared memory interface coupled to the local bus of the computer, the add-on pre-scanner card being configured to pass the payload to the computer by writing the payload to the shared memory interface, the computer being configured to receive the payload by reading the payload from the shared memory interface.

2. The apparatus of claim 1 wherein the local bus comprises a peripheral component interconnect (PCI) bus.

3. The apparatus of claim 1 wherein the shared memory interface comprises a plurality of message ring buffers for passing messages between the add-on pre-scanner card and the computer.

4. The apparatus of claim 3 wherein the add-on pre-scanner card and the computer are configured to use programmed I/O to access the message ring buffers.

5. The apparatus of claim 1 wherein the computer receives the payload from the shared memory interface by direct memory access (DMA).

6. The apparatus of claim 1 further comprising another computer configured to access the shared memory interface to receive and scan for viruses another payload previously scanned for viruses by the add-on pre-scanner card.

7. A method of inspecting computer network traffic for computer viruses, the method comprising:
receiving a plurality of packets in an add-on pre-scanner card removably plugged in a bus of a computer;
performing a first level virus scanning of a packet in the plurality of packets using a scan engine of the add-on pre-scanner card to generate a status of the packet;
forwarding at least a payload of the packet from the add-on pre-scanner card into a shared memory location;
reading the payload from the shared memory location to a main memory of the computer;
performing a second level virus scanning of the payload in the computer when the add-on pre-scanner card indicates that it cannot determine whether or not the payload is infected with a virus;
transferring a message from the add-on pre-scanner card to a ring buffer of a shared memory interface that includes the shared memory location;
polling the ring buffer to find the presence of the message in the ring buffer; and
reading the message from the ring buffer into a main memory of the computer.

8. The method of claim 7 wherein performing the second level virus scanning of the payload in the computer comprises:
gathering payloads of the same flow as the payload to assemble a file; and
scanning the file for viruses using a file-based antivirus scan-engine.

9. The method of claim 7 further comprising:
creating a flow tag that identifies the payload, the flow tag being forwarded to the shared memory location and then to the main memory along with the payload.

10. The method of claim 7 wherein the ring buffer is polled by the computer using programmed I/O.

11. The method of claim 7 wherein the payload is read from the shared memory location to the main memory of the computer by direct memory access.

12. A network security apparatus comprising:
a pre-scanner card coupled to a computer network, the pre-scanner card being configured to receive a packet from the computer network, perform a first level scan of a payload of the received packet for viruses, and provide the payload to a first computer configured to perform a second level scan of the payload for viruses when the pre-scanner card cannot determine whether or not the payload contains a virus, the pre-scanner card being coupled to a bus of the first computer; and
a shared memory interface coupled to the bus of the first computer, the pre-scanner card being configured to pass the payload to the first computer by writing the payload to the shared memory interface, the first computer being configured to receive the payload by reading the payload from the shared memory interface;
wherein the first computer is configured to gather payloads of packets of the same flow as the received packet to assemble a corresponding file when the pre-scanner card indicates that it cannot determine whether or not the payload contains a virus, the first computer including a file-based scan engine configured to scan the assembled file for viruses.

13. The apparatus of claim 12 wherein the pre-scanner card is removably installed in a slot of a local bus of the first computer.

14. The apparatus of claim 13 wherein the local bus comprises a peripheral component interconnect (PCI) bus.

15. The apparatus of claim 12 wherein the shared memory interface comprises a plurality of message ring buffers for passing messages between the pre-scanner card and the first computer.

16. The apparatus of claim 15 further comprising a second computer configured to access the shared memory interface to receive and scan for viruses another payload previously scanned for viruses by the pre-scanner card.

17. The apparatus of claim 12 wherein the pre-scanner card is configured to report the result of a virus scan to the first computer.

18. The apparatus of claim 17 wherein the pre-scanner card is configured to transfer a result of scanning the payload and the payload itself to the first computer for network security processing other than virus scanning.

* * * * *